(12) United States Patent
Kennedy, Jr. et al.

(10) Patent No.: US 7,405,696 B2
(45) Date of Patent: *Jul. 29, 2008

(54) METHOD FOR CALIBRATING AND AOA LOCATION SYSTEM FOR FREQUENCY HOPPING AIR INTERFACES

(75) Inventors: Joseph P. Kennedy, Jr., Great Falls, VA (US); Thomas B. Gravely, Herndon, VA (US); John P. Carlson, Herndon, VA (US); Doug Blackburn, Sterling, VA (US); Martin C. Alles, Vienna, VA (US)

(73) Assignee: Andrew Corporation, Herndon, VA (US)

(*) Notice: Subject to any disclaimer, the term of this patent is extended or adjusted under 35 U.S.C. 154(b) by 880 days.

This patent is subject to a terminal disclaimer.

(21) Appl. No.: 10/768,686

(22) Filed: Feb. 2, 2004

(65) Prior Publication Data

US 2004/0252752 A1 Dec. 16, 2004

Related U.S. Application Data

(60) Provisional application No. 60/443,838, filed on Jan. 31, 2003.

(51) Int. Cl.
*G01S 7/40* (2006.01)
*G01S 5/02* (2006.01)

(52) U.S. Cl. .............. 342/417; 342/174; 342/420; 375/136

(58) Field of Classification Search ............ 342/174, 342/417, 420, 442–444; 375/132, 136
See application file for complete search history.

(56) References Cited

U.S. PATENT DOCUMENTS

| | | | | |
|---|---|---|---|---|
| 5,583,517 A * | 12/1996 | Yokev et al. | | 342/457 |
| 6,184,829 B1 * | 2/2001 | Stilp | | 342/387 |
| 6,339,399 B1 * | 1/2002 | Andersson et al. | | 342/372 |
| 6,377,214 B1 * | 4/2002 | Melville et al. | | 342/442 |
| 6,580,393 B2 * | 6/2003 | Holt | | 342/453 |
| 2004/0032913 A1 * | 2/2004 | Dinur | | 375/298 |

* cited by examiner

*Primary Examiner*—Dao L Phan
(74) *Attorney, Agent, or Firm*—Duane Morris LLP

(57) ABSTRACT

A method for calibrating an antenna and signal processing system enabling angle of arrival (AOA) determination for a frequency hopping signal, in which a calibration coefficient is determined in response to one or more calibration signals injected into the system at one or more of the frequencies in the hopping sequence and proximate in time to reception of the communication signal. The calibration coefficients are reflective of a frequency and time dependent parameter of a path between the antenna and wireless location sensor. The AOA is determined as a function of the calibration coefficient and the radio frequency energy of the received communication signal. Several embodiment of the method are illustrated.

24 Claims, 9 Drawing Sheets

METHOD FOR CALIBRATING AND AOA LOCATION SYSTEM FOR FREQUENCY HOPPING AIR INTERFACES

CROSS REFERENCES

The present application is co-pending with and claims priority benefit of provisional application entitled "ANGLE OF ARRIVAL CALCULATION ON FREQUENCY HOPPING AIR INTERFACES", Application Ser. No. 60/443,838 and filed on Jan. 31, 2003, the entirety of which is hereby incorporated herein by reference.

The present application is also co-pending and concurrently filed with related applications "A METHOD FOR CALIBRATING AN AOA LOCATION SYSTEM FOR ALL FREQUENCIES IN A FREQUENCY HOPPING SIGNAL" application Ser. No. 10/768,638 and "A METHOD FOR ANGLE OF ARRIVAL DETERMINATION ON FREQUENCY HOPPING AIR INTERFACES" application Ser. No. 10/768,687 and are hereby incorporated herein by reference.

BACKGROUND

In the United States, mobile wireless appliance locating equipment is being deployed for the purpose of locating wireless callers who dial 911. Other services in addition to emergency call servicing are contemplated and are referred to as location based services (LBS). Wireless location equipment is typical employed as a overlay to wireless communication networks, thus forming a network overlay geo-location system.

In operation, these network overlay location systems take measurements on RF transmissions from mobile appliances at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations can include the time of arrival, the angle of arrival, the signal power, or the unique/repeatable radio propagation path (radio fingerprinting) derivable features. In addition, the geo-location systems can also use collateral information, e.g., information other than that derived for the RF measurement to assist in the geo-location of the mobile appliance, i.e., location of roads, dead-reckoning, topography, map matching etc.

Angle of arrival (AOA) is a well-known measurement that can be made on an RF signal for the purpose of locating a mobile appliance operating in a wireless communications network. There have been many methods disclosed to produce the AOA. Many of these methods use some method of calibration to take into account the dynamic nature of the components in path prior to the signal measurements made to estimate AOA. In general, the calibration is composed of coupling or injecting a known signal simultaneously into the receive signal paths at or close to the antenna array, and measuring the inter-channel characteristics of the test signal to characterize the traversed components (antenna beam formers, cables, RF distribution units, filters, etc.).

However these methods do not specifically deal with the problems that arise when the mobile appliance is operating in a wireless network that utilizes frequency hopping, such as the GSM air interface. The use of frequency hopping in wireless air interfaces is well known, and exemplified by GSM, the most widely deployed air interface in the world, therefore there is a need to address the problems confronted when locating frequency hopping mobile appliances.

The current subject matter provides novel approaches for efficiently calibrating an antenna and signal processing equipment, to allow generating accurate AOA measurements in equipment intended to locate wireless mobile appliances operating in a network employing frequency hopping. The novel approaches includes calibration methodologies and configurations.

In order to obviate the deficiencies of the prior art, it is an object of the current subject matter to present, in a network overlay geolocation system, a novel improvement in a method for locating a mobile appliance. The method including determining the AOA of an uplink signal from the mobile appliance at a base station from measurements, by a wireless location sensor, of an attribute of the uplink signal and a frequency specific calibration of a path between a multi element antenna array and the wireless location sensor. The novel improvement, wherein the uplink signal is a frequency hopping signal and including collecting segments of a frequency hopping signal associated with each hop and calibrating the path, at approximately the respective segment's hop frequency and proximate in time to collecting the respective segments. The improvement also including, estimating the AOA of a frequency hopping signal from the collected segments and the path calibrations.

It is also an object of the present subject matter to present, in a network overlay geolocation system, an improvement to a method for locating a mobile appliance. The method including determining the AOA of an uplink signal from the mobile appliance at a base station from measurements, by a wireless location sensor, of an attribute of the uplink signal and a frequency specific calibration of a path between a multi element antenna array and the wireless location sensor. The novel improvement, wherein the uplink signal is a frequency hopping signal and further includes collecting segments of a frequency hopping signal associated with a specific hop; calibrating the path, at approximately the specific hop's frequency, proximate in time to the collecting of each segment, over a plurality of hopping sequence cycles. The improvement also including estimating the AOA of a frequency hopping signal from the collected segments associated with the specific hop and the path calibrations at approximately the specific hop's frequency.

It is still a object of the current subject matter to present, in a network overlay geolocation system, an improvement to a method for locating a mobile appliance. The method including determining the AOA of an uplink signal from the mobile appliance at a base station from measurements, by a wireless location sensor, of an attribute of the uplink signal and a frequency specific calibration of a path between a multi element antenna array and the wireless location sensor. The novel improvement, wherein the uplink signal is a frequency hopping signal and further includes collecting segments of a frequency hopping signal associated with each frequency hop; calibrating the path, at a predetermined frequency and proximate in time to the collecting of each of the segments. The improvement also including estimating the AOA of a frequency hopping signal from the collected segments and the path calibrations at the predetermined frequency.

It is an additional object of the current subject matter to present, in a network overlay geolocation system, a novel improvement to a method for locating a mobile appliance. The method including determining the AOA of an uplink signal from the mobile appliance at a base station from measurements, by a wireless location sensor, of an attribute of the uplink signal and a frequency specific calibration of a path between a multi element antenna array and the wireless location sensor. The novel improvement, wherein the uplink signal is a frequency hopping signal and further includes collecting calibration data for each of the hop frequencies in the frequency hopping sequence; determining a relationship between the calibration data at a selected hop frequency and the other hop frequencies; collecting segments of a frequency hopping signal associated with each hop; calibrating the path, at the selected hop frequency and proximate in time to collecting the segment associated with each hop. The improvement further including estimating the AOA of a frequency hopping signal from the collected segments, the path calibrations at the selected hop frequency and the determined relationship between the calibration data for the selected hop frequency and the respective hop's frequency.

It is another object of the present subject matter to disclose a novel method of calibrating an antenna array and signal processing for receiving a frequency hopping communication signal. The method including the steps of obtaining frequency hopping operational information of the signal, receiving the signal, and injecting calibration signals at frequencies of the frequency hopping sequence in response to receipt of the communication signal. The method further including determining calibration coefficients $C_1$ and $C_2$ for said at least two frequencies and applying $C_1$ and $C_2$ to calibrate the antenna and signal processing equipment to a received signal.

It is still another object of the present subject matter to disclose a novel method of calibrating an antenna array and signal processing for receiving a frequency hopping communication signal. The method including obtaining frequency hopping operation information of the signal and receiving the signal. The method injecting a calibration signal at one frequency of the frequency hopping sequence of the signal in response to receipt of the signal and determining a calibration coefficient $C_1$ for the one frequency and, applying $C_1$ to a received signal at each frequency in the received signal to calibrate the antenna and signal processing equipment.

It is yet another object of the present subject matter to disclose a novel method of determining an angle of arrival of a frequency hopping communication signal. The method including obtaining frequency hopping operation information of the signal and receiving the signal over multiple hops of the same frequency. The method including injecting a calibration signal at one frequency of the frequency hopping sequence of the signal in response to receipt of signal and determining a calibration coefficient $C_1$ for said one frequency. The method further includes determining the AOA of the signal based on the hops of the signal having said one frequency and the calibration coefficient $C_1$.

It is still yet another object of the present subject matter to disclose a novel method of calibrating an antenna array and signal processing for receiving a frequency hopping communication signal. The method including periodically injecting calibration signals at frequencies in the frequency band of the system and determining and storing calibration coefficients for the frequencies. The method then determines relationships relating calibration coefficient of one frequency to the calibration coefficients of each of the other frequencies using the stored calibration coefficients. The method involves obtaining the frequency hopping operational information of the signal and receiving said signal. The method further includes injecting a calibration signal at one frequency in response to receipt of said signal and determining a calibration coefficient $C_1$ for said one frequency and, determining calibration coefficients for said other frequencies based on the calibration coefficient for said one frequency and the determined relationships. The method includes applying the calibration coefficients corresponding to the frequencies of the received signal to the received signal.

These objects and other advantages of the disclosed subject matter will be readily apparent to one skilled in the art to which the disclosure pertains from a perusal or the claims, the appended drawings, and the following detailed description of the preferred embodiments.

DETAILED DESCRIPTION

This present subject matter will be described with respect to a GSM network, however the subject matter is applicable and can be applied to a variety of wireless communication networks, and thus is not limited to a GSM network. Thus subject matter of the disclosure will be describe with respect to a network overlay geo-location system that derives location from the uplink signal emitted from a mobile appliance, however it is applicable and can also be applied in the context of different location methods, and thus is not limited to the network overlay location system described. The selection of the specific network and location system is for illustrative purposes only.

Figure 1:
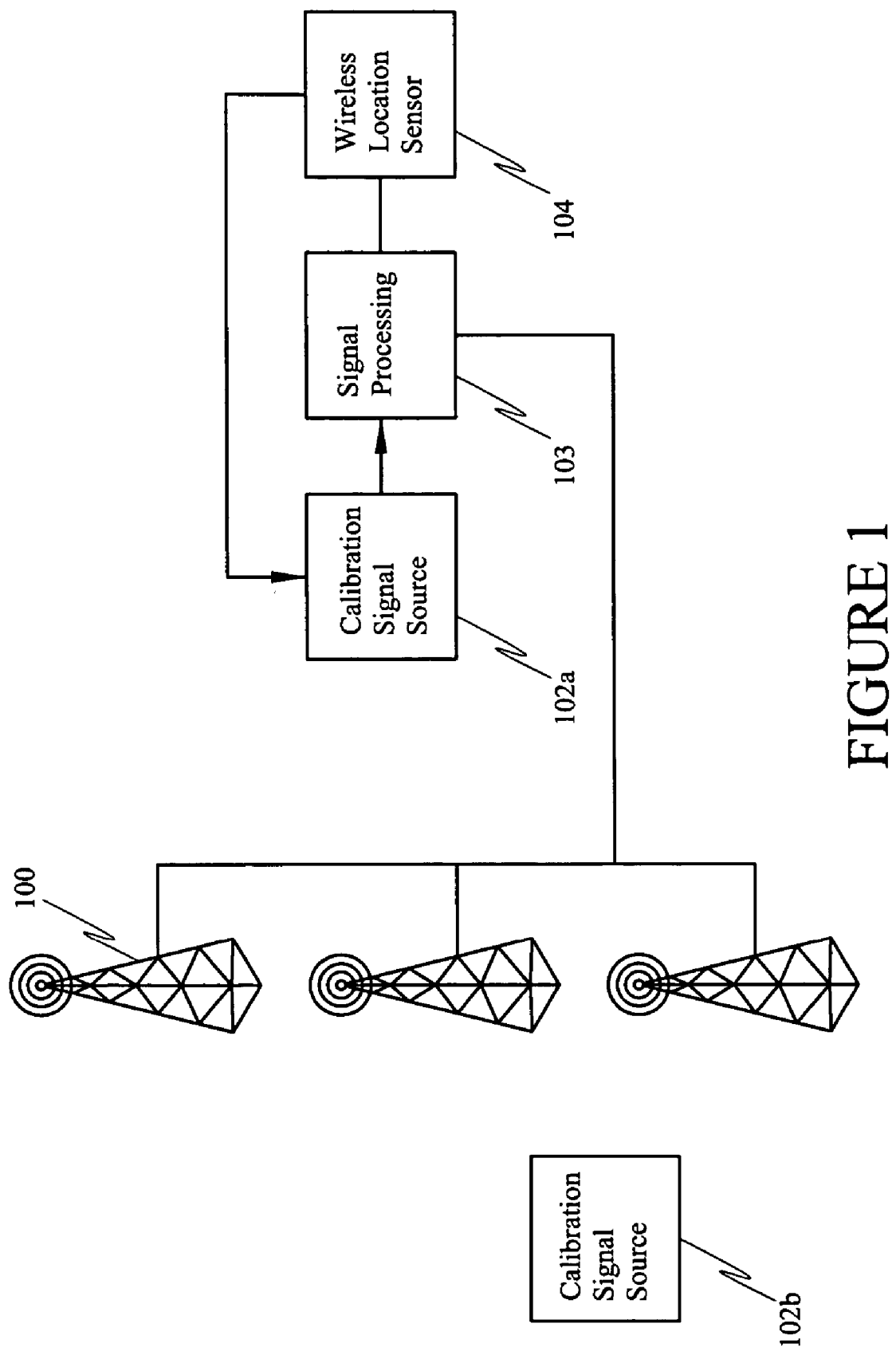
FIG. 1 is an illustrative system diagram of a system path with calibration and location components.

The prior art method to determine AOA is to estimate a line of bearing perpendicular to the face of the antenna array based on collecting a segment of RF signal at multiple antenna elements in the array. Either just prior to, or just after the collection of the segment of RF signal, the calibration signal is injected into the path at or near the antenna array to calibrate the path between the antenna and the signal collection hardware. The collected calibration data is generally made up of a series of complex voltages for each antenna element, and the relationship between the calibration signal injected into each antenna path is known. The calibration signal is generally at or near the RF frequency of the signal for which an AOA estimate is to be made. FIG. 1 is an illustration of a representative path with multi-element antenna array 101, a calibration source 102a for injecting calibration signals (or alternatively calibration source 102b that transmits the calibration signal to the antenna), signal processing equipment 103 such as beam formers, amplifiers or other like equipment and the wireless location sensor 104 that determines the angle of arrival.

The calibration data may include apriori knowledge about the antenna, receiving system and characteristics of the air interface. The calibration signal injection must be performed very close in time to the collection of the signal of interest, and at or very near the same RF frequency. This is because the characteristics of the path between the antenna and the signal collection functions have dynamic time and frequency dependent characteristics.

However, in the case of uplink signals that frequency hop, which is within the subject matter of the present disclosure, the hop durations are generally much shorter than the duration of the segment of RF that must be collected to produce an AOA estimate. Therefore, multiple RF frequencies will be contained in the segment of RF that is collected to estimate the AOA using the prior art location methods. Moreover, the hopping occurs with little time spent in the transition from one frequency to another. Generally, the transition time is insufficient to allow the calibration signal to be injected between hops. Thus these conditions do not allow the approach of single RF frequency calibration prior to, or after the signal of interest RF segment collection to be used.

The subject matter of this disclosure presents methodologies and configurations to provide path calibration for these circumstances.

In general, the hop RF frequencies, the hopping sequence and time phase, and the hop durations are known apriori. As used in the remainder of the disclosure frequency hopping sequence includes information regarding one or more of hopping sequence, hopping duration, phase, and other operation parameters of a frequency hopping signal. Several methods that can be applied to account for the hopping are described herein:

In one aspect of the subject matter, all of the RF frequencies ($f_1 \ldots f_N$) that will be used in the hopping sequence can be calibrated just prior to or just after the segment of RF energy, interchangeable referred to as RF energy of the received signal or just the received signal, is collected for the signal of interest, emergency call or LBS call. In this aspect each of the frequencies hopped to can be calibrated with its corresponding calibration data ($C_1 \ldots C_N$), where $f_1$ corresponds to $C_1$, and $f_2$ to $C_2$, etc. In this approach The RF calibration signal injection hardware used in prior art single frequency cases can be utilized, with the only new requirement on the calibration equipment would be the need for the calibration source to be able to tune rapidly through the hop frequencies of the hopping sequence so that the calibration can occur rapidly and close (or proximate in time) to the collection of the RF energy of the signal of interest.

Figure 2:
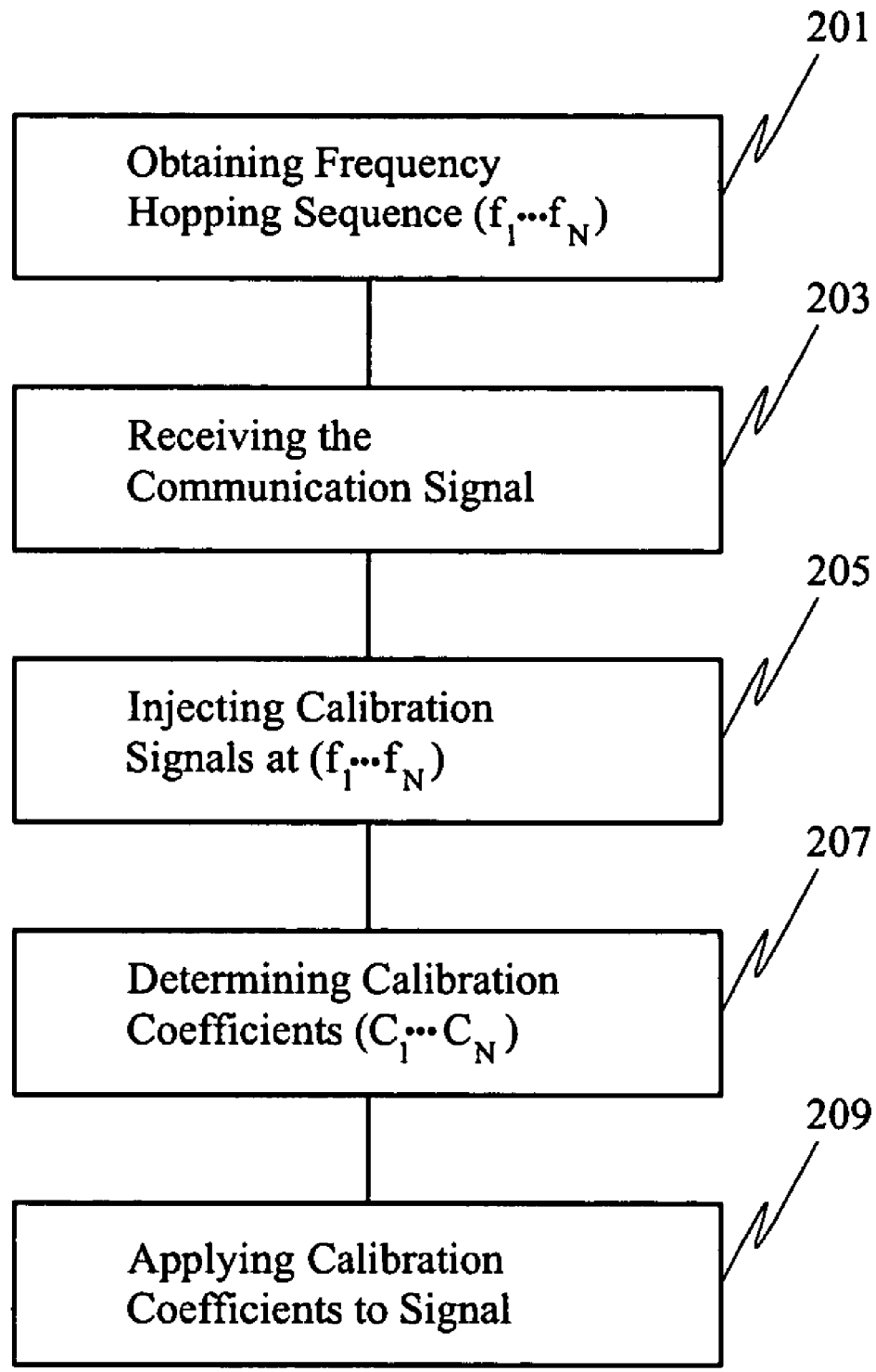
FIG. 2 is a flow chart of a method according to an embodiment of the present subject matter.

FIG. 2 is an simple flow chart of an embodiment of the present subject matter utilizing the above approach to calibrate the signal path from the antenna array to the wireless location sensor. In the first step the frequency hopping sequence of the hopping sequence of the signal ($f_1, f_2 \ldots f_N$) is obtained from the transmitting mobile over a control channel or other network entity of the host network as shown in block 201. The mobile's signal which may or may not include communication data is received at the multi-element antenna array as shown in block 203. After receiving the RF energy or received signal, the calibration source injects calibration signals at each frequency of the hopping sequence ($f_1, f_2 \ldots f_N$) into the path at or near the antennas as shown in block 205. The injection of the calibration signal is triggered by the receipt of the signal of interest. These calibration signals are used to determine calibration coefficients ($C_1, C_2 \ldots C_N$) for each of the frequencies as illustrated in block 207. With the calibration coefficients determined and the signal received the path can be calibrated for each frequency hop of the received signal using the corresponding calibration coefficients as shown in block 209. The calibration coefficients can also be used on a subsequent received signal with the assumption it is received close or proximate to the time the calibration signal where injected. The calibrated measurements of the received signal can know be used to determine the AOA of the transmitted signal using known methods.

Figure 3:
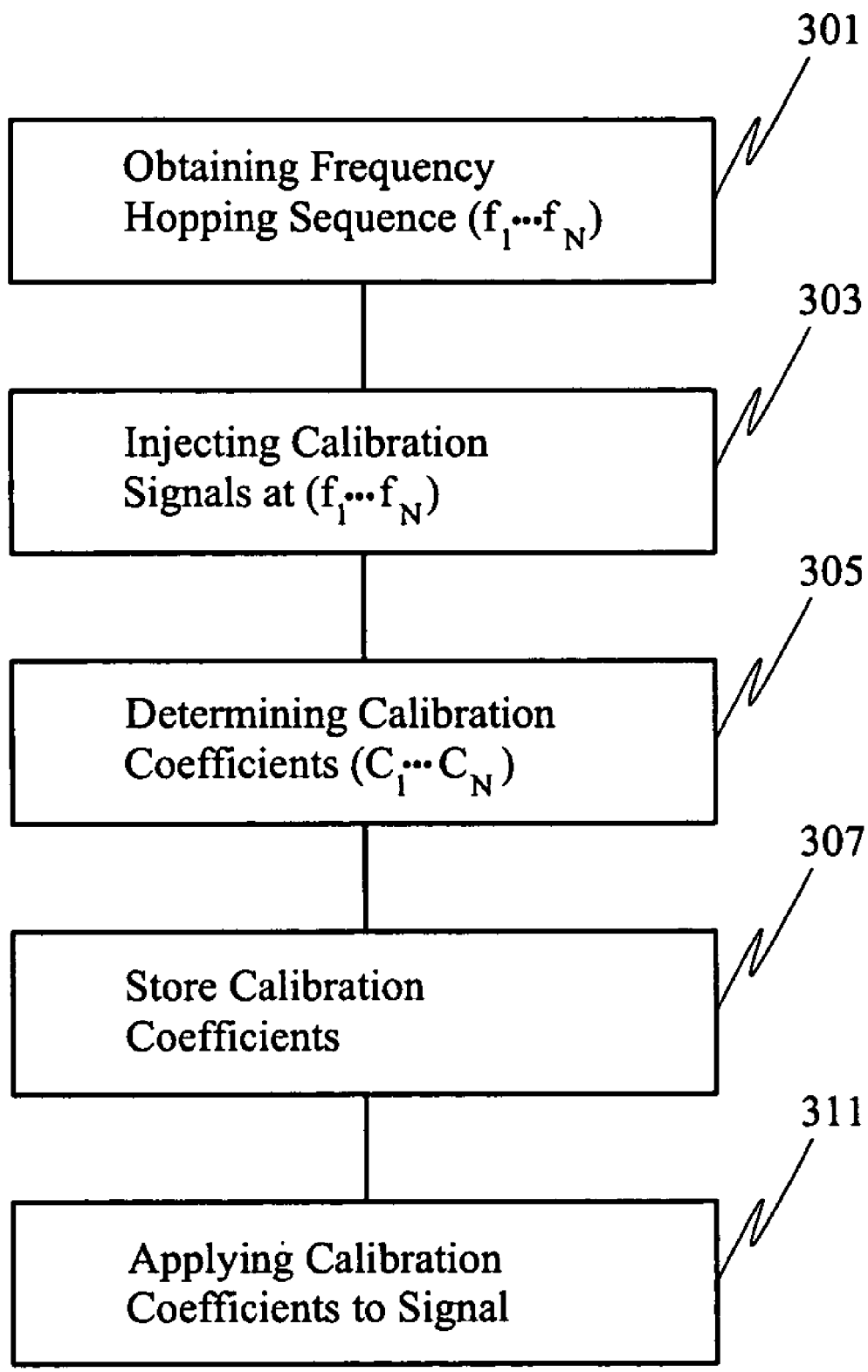
FIG. 3 is a flow chart of a method according another embodiment of the present subject matter.

Similarly FIG. 3 is a flow chart of a method in which the injection of the calibration signals are not triggered or initiated by the reception of the signal of interest.

In the first step the frequency hopping sequence of the hopping sequence of the signal ($f_1, f_2 \ldots f_N$) is obtained from the transmitting mobile over a control channel or other network entity of the host network as shown in block 301. The calibration source injects calibration signals at each frequency of the hopping sequence ($f_1, f_2 \ldots f_N$) into the path at or near the antennas as shown in block 303. The injection of the calibration signal is triggered periodically or upon a measured or anticipated deviation of the accuracy of a system parameter. These calibration signals are used as above to determine calibration coefficients ($C_1, C_2 \ldots C_N$) for each of the frequencies as illustrated in block 305. These calibration coefficients are then stored is a memory device, software or hardware as shown in block 307 for latter use when a signal of interest in received. A signal is subsequently received at the multi-element antenna array as shown in block 309 and the calibration coefficients stored in memory are applied to the received signal to calibrate the received signal to the path or vice versa as shown in block 311.

Another aspect of the disclosed subject matter takes the approach that calibration can be done on a single RF frequency either just prior or just after the signal of interest collection event, and then all RF frequencies of the hopping sequence can be calibrated with the single RF frequency. The advantage of this approach is that it is simple and can use the same calibration equipment as is typically available when single RF frequency signal are calibrated. The disadvantage of this approach is that the single calibration frequency most likely will not be completely accurate for all of the hopping frequencies, and errors can be introduced into resultant AOA estimates.

Figure 4:
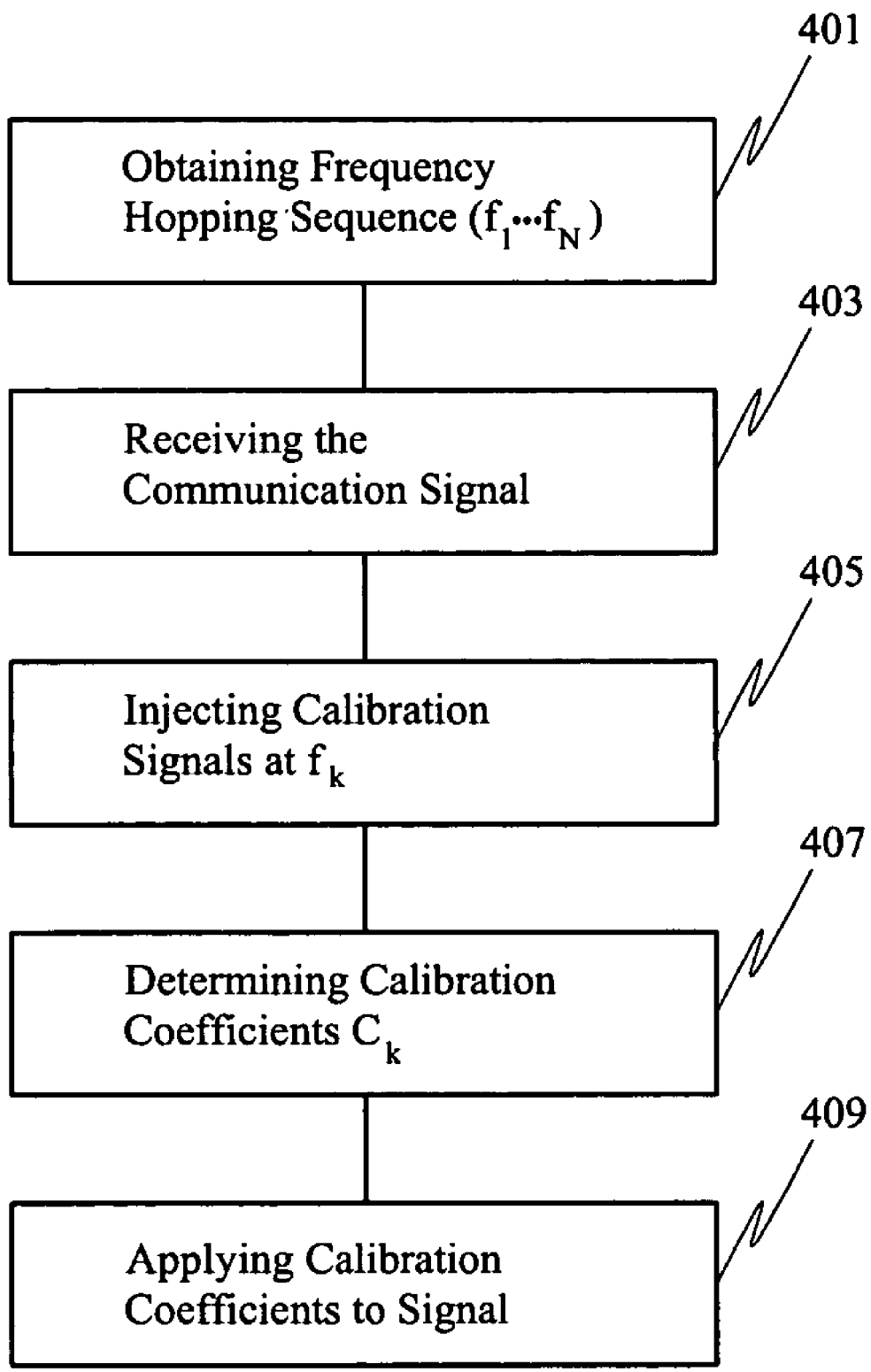
FIG. 4 is a flow chart of a method according still another embodiment of the present subject matter.

FIG. 4 is an simple flow chart of an embodiment of the present subject matter utilizing the above approach to calibrate the signal path from the antenna array to the wireless location sensor using only one calibration signal and calibration coefficient. In the first step the frequency hopping sequence of the hopping sequence of the signal ($f_1, f_2 \ldots f_N$) is obtained as shown in block 401. The mobile's signal is received at the multi-element antenna array as shown in block 403. After receiving the signal which is a triggering event, the calibration source injects a single calibration signal at a frequency $f_k$ selected from the frequencies of the hopping sequence ($f_1, f_2 \ldots f_N$) into the path as shown in block 405. The selected frequency can be arbitrarily selected or can be selected as a function of a statistic of all the frequencies in the hopping sequence, such as an average, mean, mode, first moment or other statistic of the frequencies in the hopping sequence. This calibration signal is used to determine a calibration coefficient $C_k$ for the frequency $f_k$ as illustrated in block 407. With the calibration coefficient determined and the signal received, the path is calibrated for each frequency hop of the received signal using the calibration coefficient $C_k$ for each frequency as shown in block 409. As the calibration varies as a function of frequency it is preferable to select $f_k$ such that it is close the average or the mean of the frequencies ($f_1, f_2 \ldots f_N$) or it can also be selected as the starting or first frequency of the hopping sequence for convenience.

Figure 5:
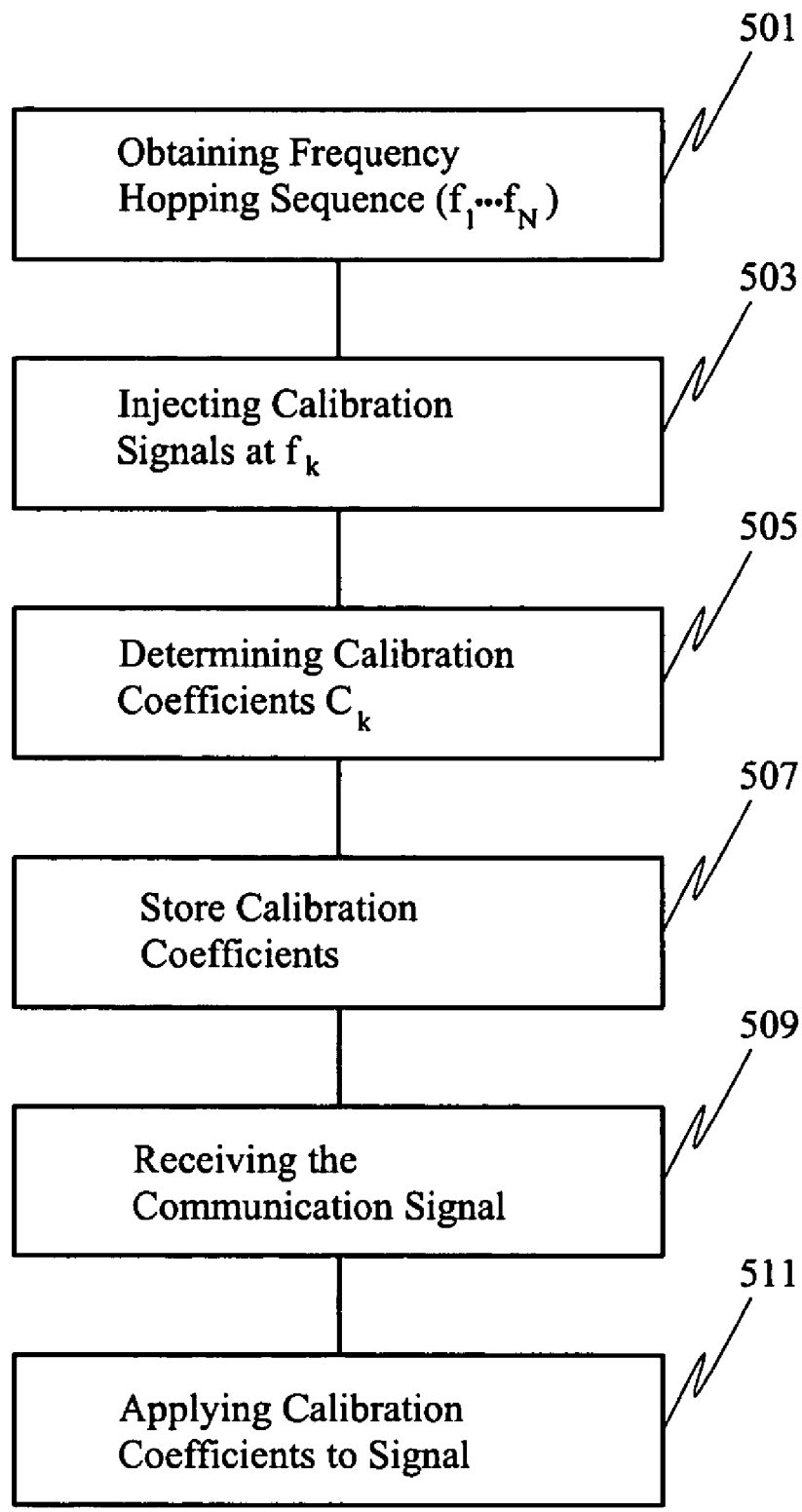
FIG. 5 is a flow chart of a method according to yet another embodiment of the present subject matter.

Similarly FIG. 5 is a flow chart of a method in which the injection of the calibration signal is not triggered or initiated by the reception of the signal of interest. In the first step the frequency hopping sequence of the hopping sequence of the signal ($f_1, f_2 \ldots f_N$) is obtained from the transmitting mobile over a control channel or other network entity of the host network as shown in block 501. The calibration source injects a single calibration signal at a frequency $f_k$ selected as described above from the frequencies of the hopping sequence ($f_1, f_2 \ldots f_N$) into the path as shown in block 503. The calibration signal is used to determine a calibration coefficient $C_k$ for the frequency $f_k$ as illustrated in block 505. The injection of the calibration signal is triggered periodically or upon a measured or anticipated deviation of the accuracy of a system parameter. This calibration signal is stored as shown in block 507. A signal is subsequently received at the multi-element antenna array as shown in block 509 and the calibration coefficient stored in memory is used to calibrate the path for the each of the frequencies of the received signal as shown in block 511.

Another aspect of the disclosed subject matter illustrates that determining AOA calibration can be done on a single RF frequency either just prior or just after the signal of interest collection event. This approach only collects RF energy from the appliance of interest when operating on the frequency used in the AOA calibration. For example, if the hopping sequence contains three frequencies $f_1, f_2, f_3$ and thus the signal transmitted from the mobile appliance cycles through the sequence ($f_1, f_2, f_3, f_1, f_2, f_3, f_1, f_2, f_3 \ldots$ etc.) Therefore if the frequency selected for the calibration signal is $f_2$ only the $2^{nd}, 5^{th}, 8^{th}$ $11^{th}$ hops will be collected by the WLS, wherein the other methods show collecting each hop of the received signal. This method works well when the total number of RF frequencies in the hopping set is small and visited in a relatively uniform fashion as demonstrated in the example. However, in the case of some GSM installations, the number of RF frequencies in the hopping sequence is 5 or 6, so if one frequency is used from the set, the collection time would have to be increased by a factor of 5 or 6, which may be disadvantageous. The calibration equipment needed to implement this method can be identical to that used for the single RF frequency case.

Figure 6:
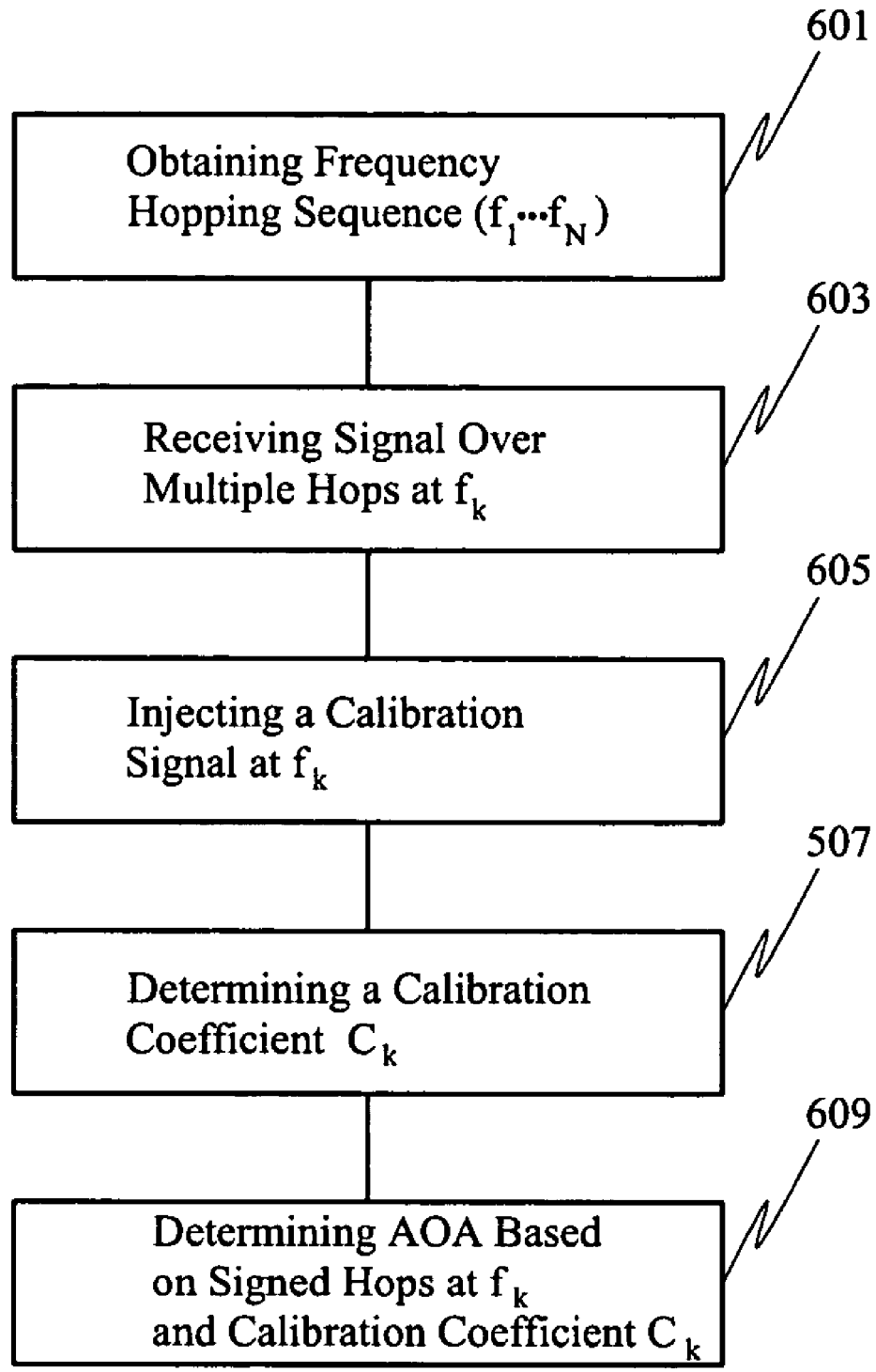
FIG. 6 is a flow chart of a method according to an additional embodiment of the present subject matter.

FIG. 6 is a simple flow chart of an embodiment of the present subject matter utilizing the above approach to determine the AOA of a frequency hopping signal from a mobile appliance which includes calibrating the signal path between from the antenna array to the wireless location sensor for the frequency hops having the same frequency using only one calibration signal and calibration coefficient. In the first step the frequency hopping sequence of the hopping sequence of the signal ($f_1, f_2 \ldots f_N$) is obtained as shown in block 601. The mobile's signal is received at the multi-element antenna array over multiple hops of frequency $f_k$ as shown in block 603. After receiving the signal which is a triggering event, the calibration source injects a single calibration signal at a frequency $f_k$ selected from the frequencies of the hopping sequence ($f_1, f_2 \ldots f_N$) into the path as shown in block 605. This calibration signal is used to determine a calibration coefficient $C_k$ for the frequency $f_k$ as illustrated in block 607. The calibration coefficient $C_k$ is used only to calibrates the frequency hops having the frequency $f_k$. The WLS collects energy from only those frequency hops with a frequency $f_k$ and along with the calibration coefficient $C_k$ are used to determine the AOA of the received signal as shown in block 609.

Figure 7:
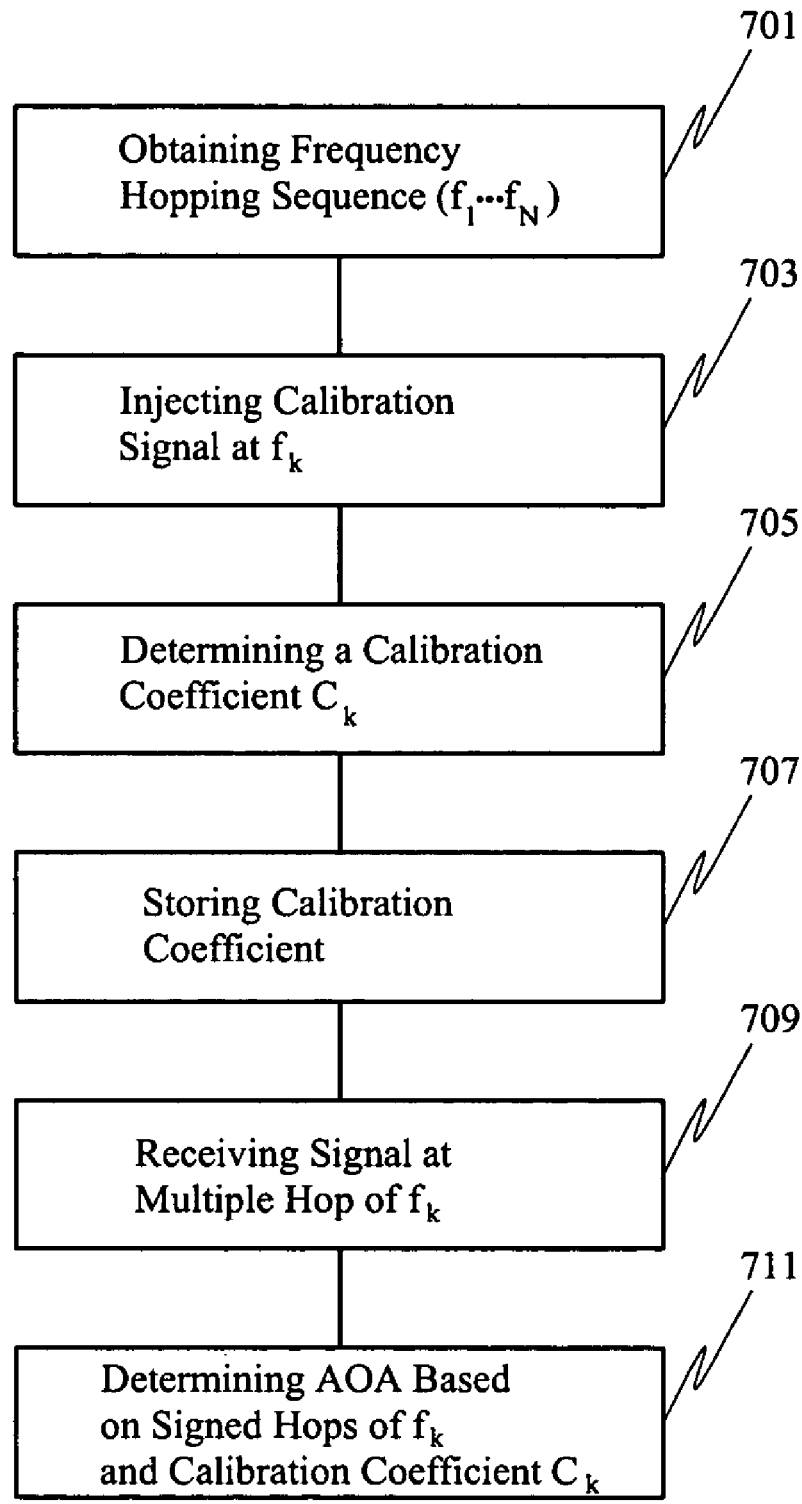
FIG. 7 is a flow chart of a method according to a further embodiment of the present subject matter.

Similarly FIG. 7 is a flow chart of a method in which the injection of the calibration signal is not triggered or initiated by the reception of the signal of interest.

FIG. 7 is an simple flow chart of an embodiment of the present subject matter utilizing the above approach to determine the AOA of a frequency hopping signal from a mobile appliance which includes calibrating the signal path between from the antenna array to the wireless location sensor for the frequency hops having the same frequency using only one calibration signal, calibration coefficient and specific frequency hops. In the first step the frequency hopping sequence of the hopping sequence of the signal ($f_1, f_2 \ldots f_N$) is obtained as shown in block 701. The calibration source injects a single calibration signal at a frequency $f_k$ selected from the frequencies of the hopping sequence ($f_1, f_2 \ldots f_N$) into the path as shown in block 703. This calibration signal is used to determine a calibration coefficient $C_k$ for the frequency $f_k$ as illustrated in block 705. The calibration coefficient $C_k$ is used only to calibrates the frequency hops having the frequency $f_k$ and is stored for latter use as shown in block 707. The mobile's signal is then received at the multi-element antenna array over multiple hops of frequency $f_k$ as shown in block 709. The calibration coefficient $C_k$ is used only to calibrates the frequency hops having the frequency $f_k$. The WLS collects energy from only those frequency hops with a frequency $f_k$, these hops, along with the calibration coefficient $C_k$ are used to determine the AOA of the received signal as shown in block 711.

In an additional embodiment of the disclosed subject matter, periodically, and unrelated to the signal of interest collection times, calibration data can be collected on all of the hopping frequencies. This data can be updated and statistically manipulated to create a running database of the calibration coefficients ($C_1 \ldots C_M$) for all of the frequencies ($f_1 \ldots f_M$) of the possible frequency hopping sequences ($f_1 \ldots f_N$) where $M \geq N$. Therefore at any time a frequency hopping signal is received there is a previously determined calibration coefficient for each frequency in the frequency hopping sequence.

Figure 8:
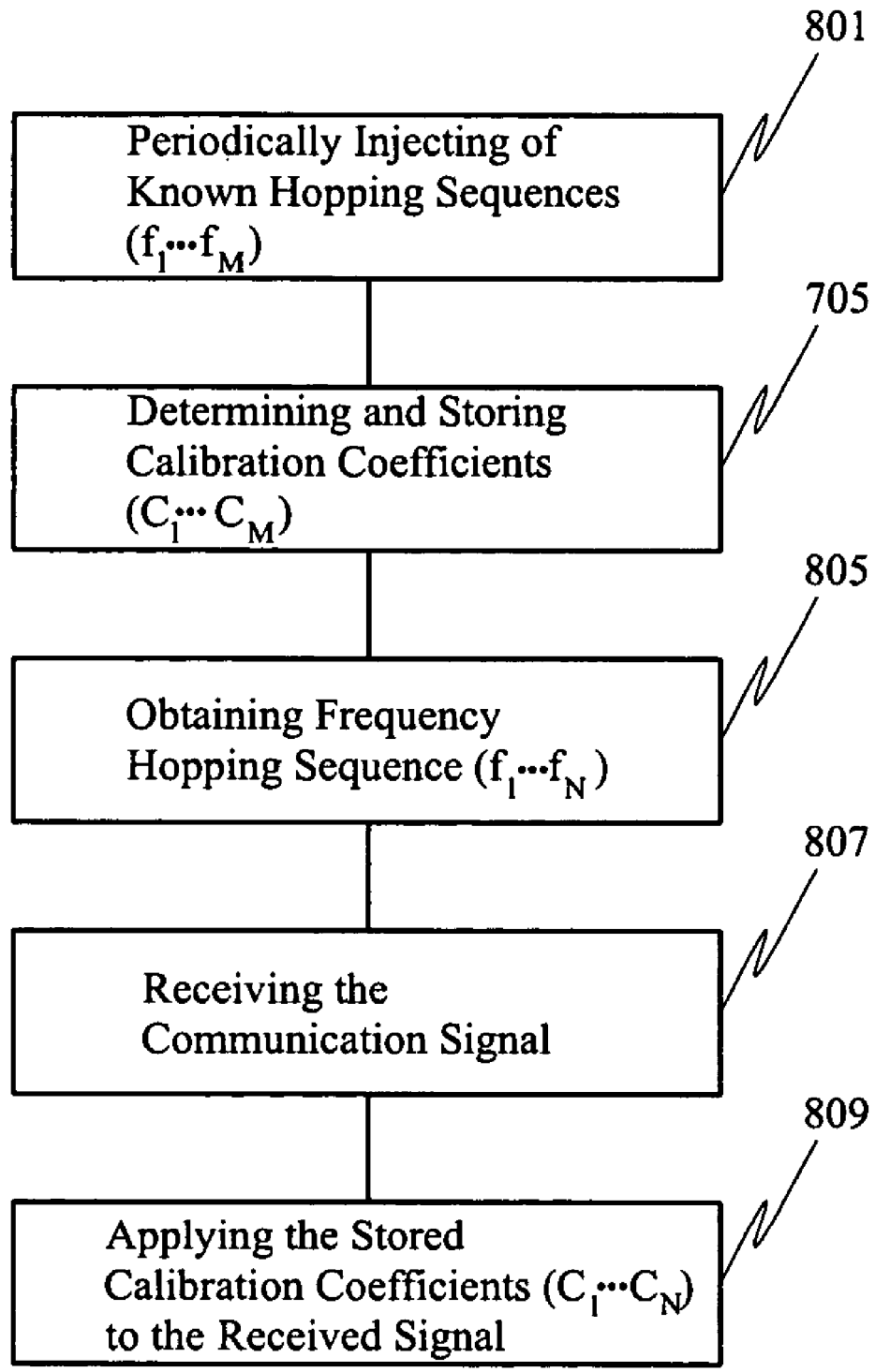
FIG. 8 is a flow chart of a method according to a still further embodiment of the present subject matter.

FIG. 8 is a simplified illustration of the above embodiment. The calibration source injects calibration signals of known frequencies ($f_1 \ldots f_M$), which represents all the frequencies in the possible hopping sequences ($f_1 \ldots f_N$) into the path as shown in block 801 This injection can be periodic or manually initiated. The calibration signals are used to determine calibration coefficients ($C_1 \ldots C_M$) corresponding to the frequencies ($f_1 \ldots f_M$) as illustrated in block 803. These calibration coefficients is also stored in an memory device. A signal is subsequently received at the multi-element antenna array as shown in block 807 and the calibration coefficients stored in the memory are applied to the received signal to thereby to calibrate each of the frequencies ($f_1 \ldots f_N$) of the received signal to the path as shown in block 809. The coefficients stored in the database can be statistically manipulated, to provide averages, weighted averages, mean, median or other statistics such that the particular calibration coefficient for a corresponding frequency is a function of more than one calibration signal at that frequency.

Another embodiment of the disclosed subject matter, periodically, and unrelated to the signal of interest collection times, collects calibration data on all of the hopping frequencies as previously describe in relation to FIG. 8. This data can then be used to derive a relationship between the calibration data at each of the hopping frequencies. For example, if the hopping frequencies are $f_1, f_2, f_3$ and $f_4$, then the phase and amplitude of the calibration coefficients $C_1, C_2, C_3$ and $C_4$ for each of the antenna elements paths for $f_2, f_3$ and $f_4$ can be referenced to $f_1$ with a general expression of being $C_x = F(C_z, f_x, f_z)$. In this example $C_2 = F(C_1, f_2, f_1)$ and $C_3 = F(C_1, f_3, f_1)$. The calibration coefficients for the several frequencies can also be determined with a relationship with two or more calibration coefficients determined for two or more reference frequencies, which could be generally described as $C_x = F(C_z,$ $C_y, \ldots C_N, f_x, f_z, f_y, \ldots f_N$). The premise is that although the calibration may change over time, the relationship from one frequency to another remains somewhat constant. Then calibration can be done on a single RF frequency either just prior or just after the signal of interest collection event, and the other calibration data could be derived for the remainder of the frequencies in the hopping set using the single RF frequency calibration data and the previously derived relationship between the frequencies. The calibration equipment required to implement this approach would be similar to that used for the single RF frequency case.

Figure 9:
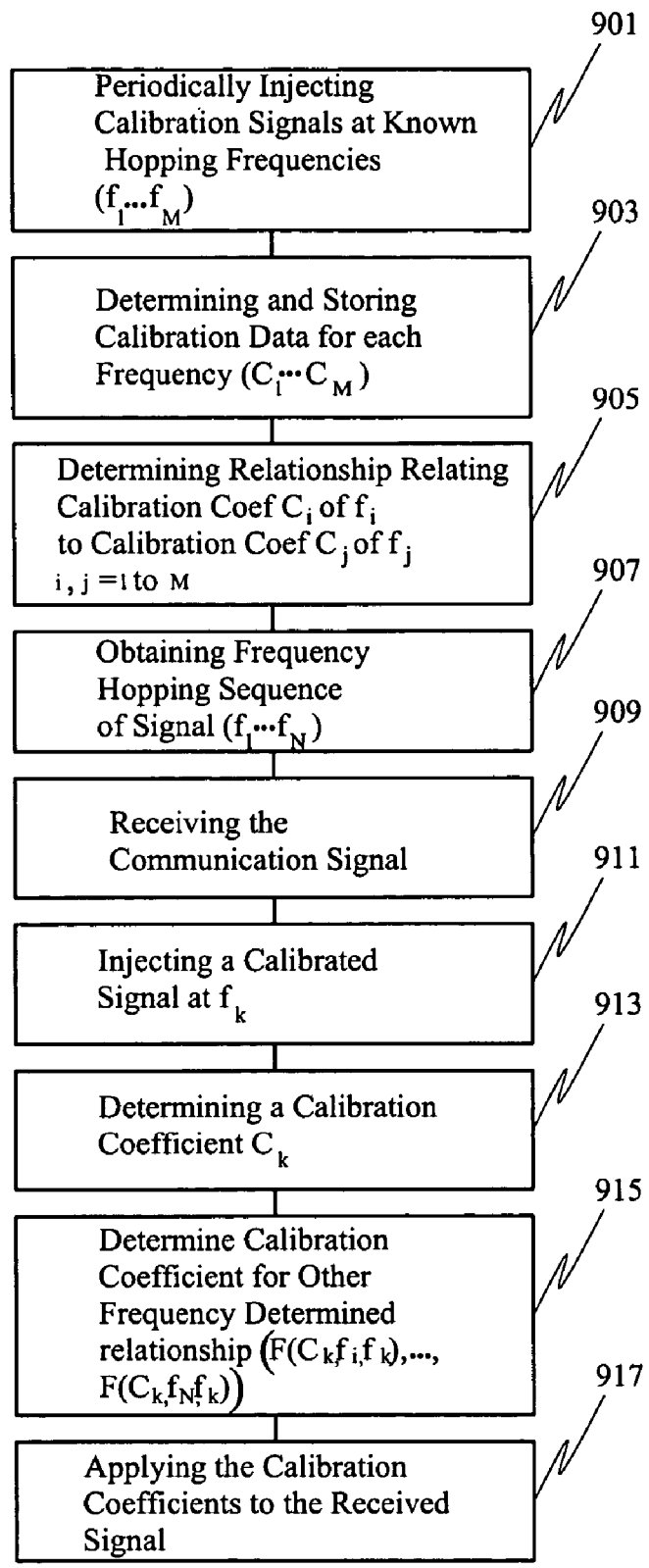
FIG. 9 is a flow chart of a method according to yet a further embodiment of the present subject matter.

FIG. 9 is a simple flowchart illustrating the above method. The calibration source injects calibration signals of known frequencies ($f_1 \ldots f_M$), which represents all the frequencies in the possible hopping sequences ($f_1 \ldots f_N$) into the path as shown in block 901 This injection can be periodic, manually initiated or some other frequently occurring trigger. The calibration signals are used to determine calibration coefficients ($C_1 \ldots C_M$) corresponding to the frequencies ($f_1 \ldots f_M$) as illustrated in block 903. These calibration coefficients are used to determine relationships relating calibration coefficient of one frequency to the calibration coefficients of each of the other frequencies using the stored calibration coefficients, such as the relationship $C_i = F(C_j, f_i, f_j)$ where j=1 to N identifies the reference frequency and i=1 to N identifies the frequency who coefficient is to be determined as shown in block 905. The one frequency to be used as a reference frequency can be arbitrarily selected or can be selected as a function of a statistic of all the frequencies in the hopping sequence, such as an average, mean, mode, first moment or other statistic of the frequencies in the hopping sequence.

The relationships exemplified by the functions are also stored in an memory device. The WLS obtains the frequency hopping sequence of the signal ($f_1 \ldots f_N$) as shown in block 907 and then receives the frequency hopping signal from the mobile appliance as shown in block 909. After receiving the signal which is a triggering event, the calibration source injects a single calibration signal at a reference frequency $f_k$ as indicated in block 911 and uses the calibration signal to determine the calibration coefficient $C_k$ a the reference frequency $f_k$ shown in block 913. The method then uses the determined relationships or ratios to derive the calibration coefficients ($C_1 \ldots C_N$) for each of the remaining frequencies in the frequency hopping sequence ($f_1 \ldots f_N$), such that $C_i = F(C_j, f_i, f_j)$, thus ($C_1 \ldots C_N$) becomes ($F(C_k, f_1, f_k), \ldots F(C_k, f_N, f_k)$). The calibration coefficients determined from the relationship are then applied to the received signal to thereby to calibrate each of the frequencies ($f_1 \ldots f_N$) of the received signal to the path as shown in block 917.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. A method of calibrating an antenna array and signal processing system for receiving a frequency hopping communication signal comprising the steps of:
   obtaining a frequency hopping sequence of the communication signal;
   receiving the communication signal;
   injecting a calibration signal at one frequency of the frequency hopping sequence of the communication signal in response to receipt of said communication signal;
   determining a calibration coefficient $C_1$ for said one frequency; and,
   applying $C_1$ to a received signal at each frequency of the received signal.

2. The method of claim 1 wherein the received signal is said communication signal.

3. The method of claim 1 wherein the received signal is a later received signal.

4. The method of claim 1 further comprising the step of determining the AOA of the communication signal based on said communication signal and $C_1$.

5. The method of claim 1 wherein said frequency hopping sequence is comprised of N frequencies $f_i$ where i=1 to N and the calibration coefficient $C_1$ is associated with each $f_i$.

6. The method of claim 1 wherein the step of injecting the calibration signal is proximate in time to receiving the received signal.

7. The method of claim 1 wherein the one frequency is determined as a function of an average frequency of the hopping sequence.

8. The method of claim 1 wherein the one frequency is the first frequency in the frequency hopping sequence.

9. The method of claim 1 wherein the one frequency is arbitrarily chosen from the frequency hopping sequence.

10. The method of claim 1 wherein the one frequency is determined as a function of a first moment of the frequencies in the frequency hopping sequence.

11. A method of calibrating an antenna array and signal processing system for receiving a frequency hopping communication signal comprising the steps of:
   obtaining a frequency hopping sequence of the communication signal
   injecting a calibration signal at one frequency of the frequency hopping sequence of the communication signal in response to receipt of said communication signal;
   determining a calibration coefficient $C_1$ for said one frequency;
   storing said calibration coefficient $C_1$,
   receiving the communication signal; and,
   applying the calibration coefficient $C_1$ to the communication signal for each frequency of the communication signal.

12. The method of claim 11 wherein the step of injecting a calibration signal is initiated periodically.

13. The method of claim 11 wherein the step of injecting is triggered in anticipation of receiving said communication signal.

14. The method of claim 11 further comprising the step of determining the AOA of the communication signal based on said communication signal and $C_1$.

15. The method of claim 11 wherein said frequency hopping sequence is comprised of N frequencies $f_i$ where i=1 to N and the calibration coefficient $C_1$ is associated with each $f_i$.

16. The method of claim 11 wherein the one frequency is determined as a function of an average frequency of the hopping sequence.

17. The method of claim 11 wherein the one frequency is the first frequency in the frequency hopping sequence.

18. The method of claim 11 wherein the one frequency is arbitrarily chosen from the frequency hopping sequence.

19. The method of claim 11 wherein the one frequency is determined as a function of a first moment of the frequencies in the frequency hopping sequence.

20. In a network overlay geolocation system, a method for locating a mobile appliance including determining the AOA of an uplink signal from the mobile appliance at a base station from measurements, by a wireless location sensor, of an attribute of the uplink signal and a frequency specific calibration of a path between a multi element antenna array and the wireless location sensor, the improvement comprising the steps of:

(a) collecting segments of a frequency hopping signal associated with a specific hop;

(b) calibrating the path, at approximately the specific hop's frequency, proximate in time to the collecting of the segment, over a plurality of hopping sequence cycles; and, (c) estimating the AOA of a frequency hopping signal from the collected segments associated with the specific hop and the path calibrations at approximately the specific hop's frequency.

21. The method according to claim 20 wherein the step of calibrating includes generating a calibration signal.

22. The method according to claim 20 wherein the step of calibrating includes tuning the calibration source to the specific hop frequency.

23. The method according to claim 20 where the plurality of hopping sequence cycles is based on hop duration.

24. The method according to claim 20 wherein the network is a GSM system.

* * * * *